United States Patent [19]

Takano et al.

[11] Patent Number: 5,417,993
[45] Date of Patent: May 23, 1995

[54] METHOD FOR PRODUCING COFFEE AROMA COMPONENT

[75] Inventors: Masashi Takano; Hiroshi Matsuda, both of Kanagawa, Japan

[73] Assignee: Takasago International Corporation, Tokyo, Japan

[21] Appl. No.: 219,465

[22] Filed: Mar. 29, 1994

[30] Foreign Application Priority Data

Mar. 30, 1993 [JP] Japan ................................ 5-093875

[51] Int. Cl.⁶ ............................................... A23F 5/48
[52] U.S. Cl. ................................... 426/312; 426/594; 426/494
[58] Field of Search ..................... 426/594, 494, 312

[56] References Cited

U.S. PATENT DOCUMENTS

| | | |
|---|---|---|
| 2,087,602 | 7/1937 | McCrosson . |
| 2,156,212 | 4/1939 | Wendt et al. . |
| 3,615,665 | 10/1971 | White et al. . |
| 4,101,681 | 7/1978 | Hurlow et al. ........................ 426/387 |
| 4,328,255 | 5/1982 | Roselius et al. ...................... 426/417 |
| 5,087,469 | 2/1992 | Acree ............................. 426/594 X |
| 5,229,153 | 7/1993 | Blanc ............................. 426/594 X |

FOREIGN PATENT DOCUMENTS

| | | |
|---|---|---|
| 59-109133 | 6/1984 | Japan . |
| 61-70944 | 4/1986 | Japan . |
| 61-88853 | 5/1986 | Japan . |
| 3217500 | 9/1991 | Japan . |

OTHER PUBLICATIONS

N. Imura, et al., *Nippon Shokuhin Kogyo Gakkaishi,* vol. 39, No. 11, pp. 1030–1037 (1992).

*Primary Examiner*—Joseph Golian
*Attorney, Agent, or Firm*—Sughrue, Mion, Zinn, Macpeak & Seas

[57] ABSTRACT

A method for producing a coffee aroma component is disclosed, which comprises the steps of feeding an aqueous solution containing from 10 to 80% by weight of ethanol and an inert gas into roasted and milled coffee beans heated to 80° to 20° C., contacting the mixture with the coffee beans, and then condensing and collecting a volatile aroma component evolving from the coffee beans. According to the present invention, the preferable aroma of fresh milled coffee beans after roasted can be perfectly collected. Further, the method of the present invention requires neither any complicated apparatus nor any special conditions. Namely, this method can be easily and inexpensively embodied. Further, it is an advantageous method from an industrial viewpoint. The coffee aroma component obtained by the method of the present invention suffers from little change in aroma during the processing and over prolonged storage. When added to coffee, coffee drinks, other foods and luxury foods, therefore, this coffee aroma component can improve and enrich the qualities of the aroma. Thus it is highly expected that the commercial values of these products can be elevated thereby.

8 Claims, 1 Drawing Sheet

METHOD FOR PRODUCING COFFEE AROMA COMPONENT

FIELD OF THE INVENTION

This invention relates to a method for perfectly and efficiently obtaining a desirable aroma evolving from fresh milled coffee beans after roasted. More particularly, it relates to a convenient method for producing a water-soluble coffee aroma component capable of improving and enriching the aroma of coffee, coffee drinks, coffee beverages or other foods or other coffee flavoring products, to which it has been added, and imparting heat resistant and persistent aroma to these products to thereby elevate the commercial values thereof.

BACKGROUND OF THE INVENTION

In recent years, a number of coffee beverages including instant coffees and canned coffees have been marketed. These products contain a coffee flavor for imparting the aroma of roasted coffee beans.

In the Japanese industry of coffee beverages, a coffee flavor falls within the category of food additives which are regulated by the Japanese Food Sanitation Law. They are defined as natural flavors (for example, a distillate or an extract of coffee beans), artificial flavors obtained by chemical synthesis or mixtures or preparations thereof which are added to foods in order to impart or enrich coffee aroma during a manufacturing or processing step [refer to "Shinteiban Shokuhin Tenkabutsu Hyoji no Jitsumu", ed. by Shokuhin Tenkabutsu Hyoji Kondankai (1990)]. It is considered that the intense and deep aroma of fresh milled coffee beans a day or two after being roasted is the most desirable coffee aroma. Thus it has been required to isolate this desirable natural aroma component as such and add the same as a coffee flavor to various coffee products, since the most effective improvement and enrichment of the coffee aroma can be thus achieved.

In order to satisfy this requirement, attempts have been made to collect the volatile aroma component of roasted coffee beans. As examples of these attempts, the following methods may be cited.

(1) Method for collecting an aroma component evolving during the step of roasting green coffee beans:

In the methods disclosed in, for example, U.S. Pat. Nos. 2,087,602 and 2,156,212, a coffee aroma component containing water is generated by roasting green coffee beans under controlling the volume of gas such as air. However, the coffee aroma component thus obtained also contains undesirable aroma ingredients. Thus, these methods require complicated procedures for eliminating these undesirable ingredients. Furthermore, this aroma component can be hardly condensed or collected. Thus it should be immediately absorbed by an appropriate material, which restricts its application range.

Furthermore, there have been reported a method wherein an aroma component containing water which is obtained by roasting is extracted by using a fluid in the supercritical state as will be described hereinafter and another method wherein it is adsorbed by an adsorbent such as active carbon, synthetic zeolite or silica gel. However, these complicated operations inevitably result in an increase in the cost.

Furthermore, JP-A-61-70944 (the term "JP-A" as used herein means an "unexamined published Japanese patent application") has disclosed a method which comprises roasting green coffee beans by indirectly heating under an inert gas stream and condensing and collecting the aroma component thus generated. In this case, however, the aroma of milled coffee beans after being roasted cannot be utilized.

(2) Method for collecting aroma component evolving during the step of milling roasted coffee beans:

This method suffers from a disadvantage that the aroma is liable to be scattered into the atmosphere and thus hardly collected.

(3) Method comprising mechanically pressing roasted and milled coffee beans under heating and obtaining the aroma component in the form of "coffee oil", i.e., a mixture with glycerides contained in a large amount in the beans:

In this method, overheating during the production process is unavoidable, which results in the scattering of the aroma into the atmosphere.

(4) Method comprising extracting roasted and milled coffee beans with an organic solvent to thereby give the aroma component as "coffee oil":

In the case of this method, the aroma component is liable to be lost during the process of recovering the employed organic solvent under reduced pressure. Further, the residual solvent should be severely restricted from the viewpoint of food sanitation.

(5) Method for collecting an aroma component by distilling the coffee oil obtained by the above method (3) or (4):

For example, JP-A-52-87248 (corresponding to U.S. Pat. Nos. 4,101,681 and 4,232,598) has disclosed a method comprising distillation under reduced pressure. However, this method requires a special apparatus for condensing and collecting the aroma component and a refrigerant at an extremely low temperature of $-196°$ C. Further, the scattering of the aroma is unavoidable during the step of returning to normal atmospheric pressure.

In addition, JP-A-3-217500 has disclosed a similar method wherein ethanol is added to coffee oil and the obtained mixture is distilled under reduced pressure. This method requires a special apparatus for the distillation under reduced pressure.

(6) Method comprising extracting roasted and milled coffee beans with a fluid at a supercritical state by using, e.g., liquefied carbon dioxide or liquid nitrogen:

For example, JP-A-47-19067 (corresponding to U.S. Pat. No. 4,328,255) has disclosed a method wherein coffee beans are extracted with carbon dioxide in the supercritical state under elevated pressure with heating, while JP-A-61-88853 has disclosed another method wherein extraction is effected in the presence of aqueous ethanol by using a fluid in the supercritical state. However each of these methods requires an elaborate apparatus.

(7) Method comprising steam-distilling roasted and milled coffee beans and separating water from the obtained distillate or extracting the aroma component alone from the distillate by using an appropriate organic solvent:

It is feared in, this method that some portion of the desirable aroma component might shift into the water. Thus, it is difficult to obtain an aroma component closely similar to the aroma composition of the roasted coffee beans by this method. Further, the treated coffee beans contain a considerably large amount of moisture, which requires a considerably high disposal cost.

For example, JP-B-50-29027 (corresponding to U.S. Pat. No. 3,615,665; the term "JP-B" as used herein means an "examined Japanese patent publication") has disclosed a method which comprises introducing water-containing, roasted coffee beans in a container, passing a saturated vapor at a high temperature and an elevated pressure therethrough, liberating this vapor via a vent line, closing the line after stabilization, and condensing and collecting the vapor. However it is not clear whether the aroma composition of the coffee beans can be taken out as such or not by this method. Also, this method is disadvantageous in requiring a pressure container of a large capacity.

In accordance with Nippon Shokuhin Kogyo Gakkaishi, 39 (11), 1030–1037, (November, 1992), furthermore, N. Imura et al. have proposed a method for collecting the aroma of Arabica coffee beans alone from a steam-distillate of roasted coffee which is to be added in order to improve the desirability of an instant coffee product, since the aroma of the distillate collected from Robusta coffee beans does not suit consumers' preference. However it cannot be concluded that this method is the best one. This is because it suffers from an increase in the cost, since Arabica coffee beans are much more expensive than Robusta coffee beans.

Further, JP-A-59-109133 has disclosed a method which comprises passing steam, and/or an inert gas through roasted and milled coffee beans and collecting the vapor phase containing a volatile coffee flavor component thus liberated by introducing the same into a solution of an amino-carbonyl reaction product and/or caramel of pH 5 or below without condensation. In the case of this method, the amino-carbonyl reaction product and/or caramel serve as a flavor component, which seriously restricts the utilization sphere of the obtained coffee flavor.

Although there have been proposed various attempts to collect the aroma of roasted coffee beans as discussed above, no satisfactory method therefor has been established so far.

With the diversification in food products in recent years, it is further required in the industry of coffee beverages to develop a coffee aroma component which is as good as by milk flavor and excellent in stability during retorting processing as well in stability over prolonged storage.

SUMMARY OF THE INVENTION

It is an object of the present invention to satisfy these requirements in the art by establishing a method for producing a coffee aroma component whereby the problems, which cannot be solved by the conventional, can be solved, namely, a method for perfectly, easily and inexpensively obtaining the aroma component of fresh milled coffee beans after roasting.

To achieve this object, the present inventors have conducted extensive studies on a method for separating the volatile aroma component contained in fresh milled coffee beans after roasting, which are employed as a starting material, and collecting the same. As a result, they have successfully found out that when these coffee beans are heated to a temperature within a specific range and then contacted with a vapor comprising ethanol vapor, steam and an inert gas at a specific flow rate in a well-balanced state while maintaining the mixture in such a state as to allow the evolution of the aroma component, a mixed vapor containing the volatile aroma component evolving from the coffee beans can be obtained; and that the aroma of the roasted and milled coffee beans can be perfectly, easily and economically collected by condensing and collecting the above-mentioned mixed vapor.

The present inventors have further found out that, when added to various coffee products, the aroma component obtained by this method not only improves and enriches the aroma of the products but also gives an aroma excellent in heat resistance and persistence. The present invention has been completed on the basis of these findings.

Accordingly, the present invention provides a method for producing a coffee aroma component which comprises the steps of feeding a mixture of vapor of an aqueous solution containing from 10 to 80% by weight of ethanol with an inert gas into roasted and milled coffee beans heated to 80° to 120° C., contacting the mixture with the coffee beans, and then condensing and collecting a volatile aroma component evolving from the coffee beans.

Figure 1:
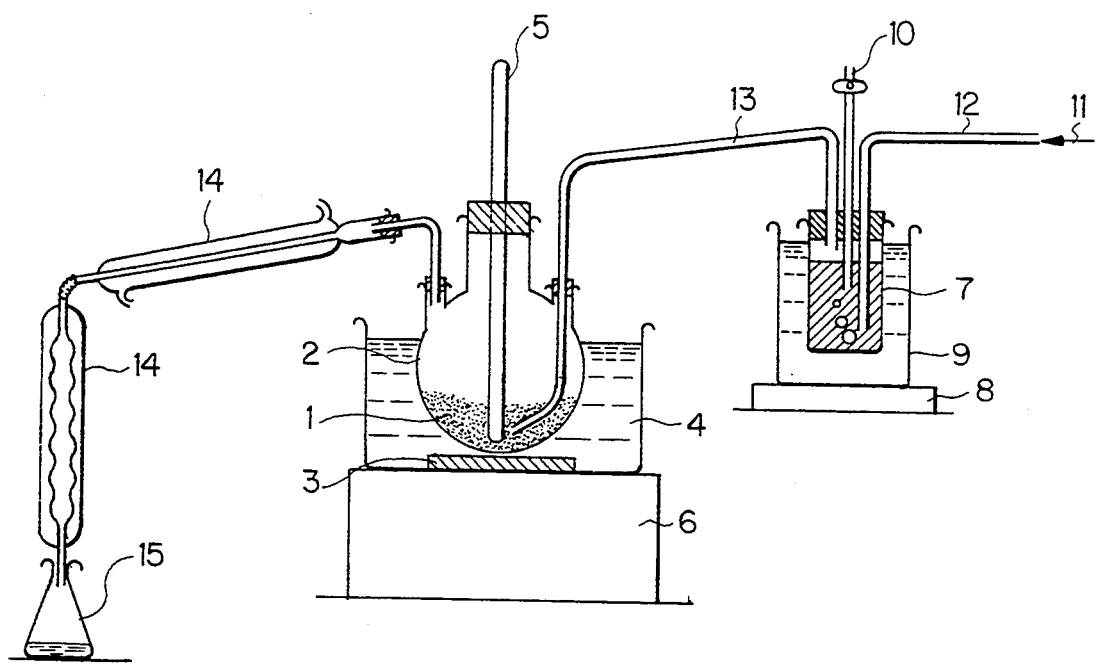
FIG. 1 is a schematic view of the apparatus employed in Examples, wherein each number stands for the meaning as defined hereinbelow.

1: coffee beans.
2: container four coffee beans.
3: immersion heater for heating coffee beans.
4: heating medium.
5: thermometer and temperature controller.
6: stirrer for stirring coffee beans.
7: container four aqueous solution of ethanol with inert gas.
8: heater for heating aqueous solution of ethanol with inert gas.
9: water bath.
10: water and ethanol inlet.
11: inert gas.
12: inert gas-introduction system.
13: collection vapor of aqueous solution of ethanol with inert gas-introduction system.
14: condenser for condensing mixed saturated vapor.
15: receiver for condensate.

DETAILED DESCRIPTION OF THE INVENTION

To embody the method of the present invention, roasted and milled coffee beans are introduced into a container which withstands heating and stirring. With heating to 80° to 120° C., a mixture of vapor of an aqueous solution containing from 10 to 80% by weight of ethanol with an inert gas (hereinafter sometimes referred to as the "collecting medium") is introduced into the container and fully contacted with the above-mentioned roasted and milled coffee beans. A volatile aroma component thus evolving from the coffee beans is taken out from the container together with the vapor of the collecting medium. Then the vapor is condensed with, for example, a condenser and the volatile aroma component is collected therefrom.

The variety, producing area, the roast level and the degree of milling of the coffee beans to be used in the present invention are not particularly restricted but appropriately selected depending on the purpose. A blend of different types of the roasted and milled coffee beans may be used.

For example, it is preferable to preliminarily determine the relation between the roast level and the aroma component through experiments to thereby obtain a particularly preferable aroma component.

The roast level should be determined on the basis of experience depending on, for example, the variety and producing area of the green coffee beans. When the roast level is expressed in a color value (L-value) in accordance with the experiments performed by the present inventors, an L-value ranging from 15 to 20 is suitable for obtaining a preferable aroma component in the case of Arabica coffee produced in Brazil, an L-value ranging from 20 to 25 is suitable therefor in the case of those produced in Columbia or Guatemala, and an L-Value ranging from 25 to 30 is suitable therefor in the case of those produced in Ethiopia or Indonesia.

Accordingly, it is preferable in the present invention to use roasted coffee beans having an L-value falling within the range as specified above.

In order to obtain roasted coffee beans having the above-mentioned L-value on a small scale, coffee beans may be roasted by using an electric sample roaster (a product of PROBAT-WERKE Gmb H &Coi) until the desired L-value is obtained. In the case of roasting on an industrial scale, on the other hand, coffee beans may be roasted by using a gas-grill type small-sized apparatus (a product of PROBAT-WERKE Gmb H & Co.) until the desired L-value is achieved. The L-value of coffee beans is usually expressed within a range of from 15 to 30 and a smaller L-value shows a higher roasting level and vice versa.

It is also preferable to preliminarily determine through experiments the optimum range of the relation between the degree of milling of the roasted coffee beans (i.e., the grain size) and the amount of the aroma component.

Two days after roasted, Arabica coffee beans (L-value =22) are milled in such a manner as to give various grain sizes. Then coffee beans of each grain size are treated by way of trial by the method of the present invention with the use of a collecting medium comprising an aqueous solution containing 50% by weight of ethanol and nitrogen gas at 105° C. (the final temperature reached by starting from 80° C. and then slowly elevating) for 2 hours.

That is to say, the relation between grain size and the amount of the aroma component is examined by collecting the aroma components from coffee beans of 4 grain sizes including: (A) coffee beans milled each in 4 pieces; (B) coffee beans milled in smaller pieces than (A) but having a particle size exceeding 2.36 mm (those not passing through a 7.5-mesh sieve as specified in New JIS (Japan Industrial Standard)); (C) coffee beans having a particle size exceeding 0.355 mm but not more than 2.36 mm (those not passing through a 42-mesh sieve but passing through a 7.5-mesh sieve as specified in New JIS); and (D) coffee beans having a particle size smaller than 0.355 mm (those passing through a 42-mesh sieve as specified in New JIS). As the result of the examination on the balance of the obtained aroma and the intensity of the residual aroma of the treated coffee beans, it is found out that the coffee beans (C) having a particle size exceeding 0.355 mm but not more than 2.36 mm are the most suitable for obtaining an excellent aroma component.

Accordingly it is preferable in the present invention to use coffee beans of a grain size at around this level.

The coffee beans thus roasted and milled are introduced into a container provided with an inlet for the collecting medium, which will be described hereinafter, and a discharge port for the mixed vapor and then heated to about 80° to 120° C. therein.

It is preferable to indirectly heat these roasted and milled coffee beans. For example, a heating medium such as silicone oil is heated by using various heating units and then the container containing the coffee beans is indirectly heated thereby.

In the method according to the present invention, it is necessary to contact the roasted and milled coffee beans thus heated with an aqueous solution of ethanol which has been heated until it becomes a vapor. Although the temperature of the vaporization of the aqueous solution of ethanol varies depending on the employed composition ratio of ethanol to water, the boiling point of ethanol under normal atmospheric pressure is 78° C. Thus it is necessary to heat the aqueous solution to a temperature of about 80° C. at the lowest for the generation of the saturated vapor of the aqueous solution of ethanol. When the temperatures necessary and sufficient to the extrusion of the saturated vapor from the container containing coffee beans and to the complete isolation of the desired coffee aroma component are taken into consideration, the heating should be performed to the temperature as specified above, namely, from 80° to 120° C.

Although the heating temperature varies depending on, for example, the variety of the employed coffee beans, a higher content of ethanol generally allows heating at a relatively lower temperature. Further, the temperature may be elevated during the process of the operation, if necessary.

The contact of the heated coffee beans with the vaporized collecting medium may be preferably performed by continuously feeding the collecting medium. It is preferable that this collecting medium is in the form of a saturated vapor containing ethanol vapor, steam and an inert gas. By contacting this collecting medium with the coffee beans, a saturated vapor containing the coffee aroma component (hereinafter sometimes referred to as the "mixed saturated vapor") can be obtained.

Although unsaturated ethanol vapor and steam may be used, the aroma thus obtained sometimes loses its balance in such a case.

The optimum range of the composition ratio of the ethanol to water to be used in the collecting medium may vary depending on, for example, the variety of the employed coffee beans. It is therefore preferable to determine this optimum range through experiments too. According to experiments carried out by the present inventors, when roasted and milled Arabica coffee beans produced in Brazil (L-value=15–20) are used, an aroma component obtained by controlling the ethanol concentration to 10 to 60% by weight is highly evaluated in particular. Similarly, in the case of Arabica coffee beans produced in Guatemala (L-value=20–25), an aroma component obtained by controlling the ethanol concentration to 20 to 70% by weight is highly evaluated. Further, in the case of Arabica coffee beans produced in Ethiopia (L-value=25–30), an aroma component obtained by controlling the ethanol concentration to 30 to 80% by weight is highly evaluated.

Accordingly, the ethanol concentration in the aqueous solution may be controlled within a range of from 10 to 80% by weight depending on the variety and the roast level of the employed coffee beans.

In general, coffee beans with a higher L-value may be treated by controlling the ethanol concentration at the higher level.

The reason for the use of an inert gas in the collecting medium resides in that decomposition of coffee beans due to overheating or oxidation due to oxygen can be prevented thereby and thus the coffee aroma component can be advantageously isolated and collected. This inert gas is not restricted to the elements of the 18 group in the periodic table (for example, helium) but may be arbitrarily selected from the gases whose chemical activities are poor such as nitrogen gas. It is particularly advantageous from an economical viewpoint to use nitrogen gas which can be easily and inexpensively obtained.

The step of contacting the collecting medium with the coffee beans can be carried out in detail in the following manner.

Namely, an aqueous solution of ethanol with a controlled concentration is introduced into an appropriate container and then its temperature is controlled by heating so as to give a difference from the heating temperature of the coffee beans of, preferably, 30° C. or below. This preheating is performed in, order to shorten the period of time for attaining the saturated vapor of the collecting medium. When heated to an excessively high temperature, however, there is a risk of evaporation. It is therefore recommended to heat the aqueous solution to about 50° to 70° C.

Next, a definite amount of an inert gas is introduced into this aqueous solution of ethanol through, for example, an inlet tube to thereby give a collecting medium. This collecting medium is then fed through an outlet tube so as to contact with the coffee beans in the state of a saturated vapor. The aqueous solution containing from 10 to 80% by weight of ethanol and the inert gas can also be preliminarily heated.

In this case, it is preferable, if no harm will be done, to provide the opening of the collecting medium-outlet at around the center of the coffee beans contained in the container so as to ensure the contact of the coffee beans with the fresh-supplied collecting medium within a short period of time.

The flow rate of the inert gas or the aqueous solution of ethanol may be controlled depending on the amount of the aroma component to be condensed and collected. The amount of the collected aroma component ranges from about 0.15 to 1.9 l/hr per kg of the roasted and milled coffee beans, though it varies depending on the variety and the degree of roasting of the employed coffee beans.

The flow rate of the inert gas in the collecting medium may be controlled to 0.006 to 6 l/hr, still preferably 0.06 to 0.12 l/hr, per kg of the roasted and milled coffee beans. When the flow rate of the inert gas is lower than 0.006 l/hr, the prolonged residence of the coffee aroma component in the container might result in the deterioration in the aroma. On the other hand, a flow rate of the inert gas exceeding 6 l/hr is not preferable, since it is feared in this case that the aroma component is not sufficiently condensed but scattered into the atmosphere.

The flow rate of the aqueous solution of ethanol in the collecting medium varies depending on the flow rate of the inert gas. It is recommended to control the flow rate of the aqueous solution of ethanol to 0.2 to 2 l/hr, still preferably 0.5 to 2 l/hour, in the state of a gas-containing liquid.

The ratio of the collecting medium fed into the container which is utilized in the evolution and collection of the coffee aroma component in practice falls within a range of from 85 to 95%. This ratio increases almost in proportion to the flow rate. This ratio is calculated by subtracting the amount of the volatile aroma component of the coffee beans from the total collected saturated vapor on the basis of the amount of the aqueous solution of the alcohol. Namely, the flow rate of the inert gas is not taken into consideration.

To feed this collecting medium, a suitable pump (for example, a pulsating pump, diaphragm or tubing pump in the case on a laboratory scale, or a small-sized plunger pump in the case on an industrial scale) may be used. The inert gas and the aqueous solution of ethanol may be separately fed into the container containing the coffee beans under controlling the flow rate of both respectively.

It is recommended that the container for the aqueous solution of ethanol is provided with an appropriate inlet so as to optionally supply ethanol and water. To efficiently contact the saturated vapor of the collecting medium with the coffee beans, furthermore, it is preferable to stir the coffee beans with an appropriate means.

Subsequently, the coffee aroma component is obtained from the mixed saturated vapor thus obtained by condensing the mixed saturated vapor with the use of, for example, a condenser and then collecting into an appropriate receiver.

It is preferable to control the temperature condensing the mixed saturated vapor as low as possible by using a refrigerant. In order to collect a particularly well-balanced aroma component, it is preferable to control the condensing temperature to 5° C. or below. A condensing temperature exceeding 5° C. is undesirable, since the aroma component cannot be fully collected in some cases. Since the aroma component to be collected contains moisture, an excessively low condensing temperature causes the formation of ice on, for example, the heat transferred surface of the condenser. As a result, it is feared that the condensation performance is deteriorated and the passage of the mixed saturated vapor is blocked thereby.

Accordingly, it is recommended in practice to control the condensing temperature to −10+ to 5° C.

The time required for the isolation and collection of the aroma component is determined by judging the termination point on the basis of the obtained aroma component and the residual aroma component of the treated coffee beans. Although this period of time may be appropriately selected depending on the variety and the roast level of the employed coffee beans, it preferably ranges from 30 to 300 minutes in general, still preferably from 40 to 180 minutes. This period is controlled mainly by adjusting the supply of the collecting medium. In order to prevent the deterioration of the aroma, it is generally preferable to shorten the treatment time.

The total amount of the coffee aroma component thus collected varies depending on the variety and the roast level of the coffee beans. In general, it varies from about 20 to 200% by weight based on the starting roasted and milled coffee beans. This amount involves the ethanol and water which are condensed together with the volatile aroma component evolving from the coffee beans (i.e., the condensate).

The coffee aroma component thus obtained is in the form of a transparent or yellowish (varying depending on the roast level of the coffee beans), slightly acidic liquid at room temperature. This aroma component has such an aroma intensity like that of fresh milled coffee beans after roasted, and is sufficiently sensible even after diluting 1,000-fold to 2,000-fold with water.

The coffee aroma component may be added as such to coffee products. Alternately, it can be diluted with an appropriate solvent, carried by an appropriate carrier or concentrated, depending on the purpose. When it is to be added to canned coffee beverages, for example, the obtained aroma component may be added as such at a ratio of from 0.03 to 0.1% by weight.

As described above, the addition of the coffee aroma component of the present invention to a coffee product makes it possible to enhance the preference for the product by improving and enriching the inherent aroma of coffee. Further, it imparts a heat resistance and persistence and suffers from little change in aroma during the processing step or over prolonged storage. Thus it is expected that the commercial value of the product is largely elevated thereby. The coffee aroma component according to the present invention is applicable not only to coffee beverages but also to various foods, to which a coffee flavor is to be added, over a wide range.

To further illustrate the present invention in greater detail, and not by way of limitation, the following Examples will be given.

FIG. 1 is a schematic view of an apparatus employed in the following Examples. This apparatus consists of a container 2 for coffee beans 1, an immersion heater 3 for heating these coffee beans indirectly, a heating medium 4, a thermometer and temperature controller 5, a stirrer 6 for stirring the coffee beans, a container 7 for a collecting medium comprising an aqueous solution of ethanol with inert gas, a heater 8 for heating the collecting medium, a water bath 9, an inlet 10 for water and ethanol, an introduction system 12 for the inert gas 11, a collecting medium-introduction system 13, a condenser 14 for condensing the mixed saturated vapor, a receiver 15 for the condensate, and various other measuring instruments.

In the following Examples and Comparative Examples, the parts of this apparatus which come into direct contact with the roasted and milled coffee beans, the collecting medium supplied thereto and the obtained coffee aroma component are made of glass, stainless or a heat-resistant plastic material. When this method is to be embodied on an industrial scale, further attention should be paid to the effects of these materials on the final coffee product. By paying such attention, the method of the present invention can be economically and inexpensively applied on a commercial scale.

EXAMPLE 1

To a glass separable flask 2 of a capacity of 5 liter (a flask which can be separated into the upper and lower parts, hereinafter referred to as the "main flask") which was provided with an inlet for a collecting medium comprising an aqueous solution of ethanol with an inert gas (nitrogen gas), an opening for fixing a condenser, a thermometer and temperature controller 5, and a powerful stirrer 6, a condenser 14 adjusted to 5° C. which could be controlled over a temperature range of from −15° to 20° C. was fixed in such a manner as to be open to the atmosphere. At the outlet of the condenser, an Erlenmeyer flask of a capacity of 1 liter (hereinafter referred to as the "collection flask") 15 was attached.

600 g of roasted and milled Arabica coffee beans produced in Brazil (L-value=15.5; grain size distribution: grains>2.36 mm=8±3%; 2.36 mm≧grains≧0.355 mm=about 85%, 0.355 mm>grains=less than 5%) were fed into the main flask. Beside this flask, an oil bath 4 containing silicone oil (KF-96-30CS Type, a product of Shin-Etsu Chemical Co., Ltd.) which had been preliminarily adjusted to a temperature of 135° to 140° C. with the use of an electric heater 3 (200 V, 1 kW) as a heat source was prepared.

On the other hand, an appropriate amount of an aqueous solution containing 40% by weight of ethanol was introduced into a three neck flask 7 (hereinafter referred to as the "feeding flask") provided with an inlet for water and ethanol, a nitrogen gas inlet and a feeding port for the main flask and maintained at 50° to 55° C. in a water bath 9.

Before starting the main experiment, a pre-experiment was carried out in order to determine the amount of the condensate having a preferable aroma to be collected, namely, the amount of the coffee aroma component to be collected.

That is to say, the main flask was located in the oil bath. When the temperature around the fixing port of the main flask for the condenser reached 80° C., the feeding port of the feeding flask was connected to the inlet of the main flask. Then the flow rate of the nitrogen gas was adjusted in such a manner that 1% (based on the weight of the starting roasted and milled coffee beans) of the aroma component could be obtained per minute (more particularly, the flow rate of the nitrogen gas was set to 1 liter/kg of coffee beans/hr, while the flow rate of the collecting medium comprising the aqueous solution of ethanol with the nitrogen gas was set to 0.6 liter/kg of coffee beans/hr). Then the collection of the aroma component was initiated and continued for 200 minutes at intervals of 10 minutes.

As a result, a preferable aroma was obtained until the cumulative amount of the aroma component reached 100% after 100 minutes. When the cumulative amount exceeded 100 the aroma characteristic to the fresh milled coffee beans was rapidly lost. Accordingly, this amount was determined as the final collection level.

Further, another pre-experiment for shortening the time required for the achievement of a cumulative amount of the aroma component of 100% was performed in the following manner. When the temperature in the main flask reached 80° C. similar to the process as described above, the feeding port of the feeding flask was connected with the inlet of the main flask. Then the flow rate of the nitrogen gas was adjusted in such a manner that the cumulative amount of the aroma component reached 100%, 20 minutes, 30 minutes, 40 minutes, 50 minutes, 60 minutes, 70 minutes, 80 minutes, 90 minutes and 100 minutes after the initiation of the collection of the aroma component. Thus the aroma component was collected.

As a result, the temperature in the main flask at the completion of the collection (the final temperature) was 106° C. while the treated coffee beans weighed from 620 to 625 g in each of these cases. When the aroma of the coffee beans immediately after the treatment was evaluated, no preferable coffee aroma remained any more in the coffee beans which had been treated for 40 minutes or longer. Based on these results, the collection time to be used in the following experiment was determined as 40 minutes, namely, the shortest period of time giving the good result.

On the basis of these pre-experiments, the main experiment, wherein the amount of the aroma component based on the weight of the starting roasted and milled coffee beans was set to 100%, the collection time was set to 40 minutes and the temperature in the main flask was controlled to 80° to 106° C. , was repeated thrice. The coffee aroma components thus obtained were each in the form of a yellowish liquid of pH 4.9. The aromas of these products were organoleptically evaluated by 3 skilled panelists by the triangle test [i.e., a method for distinguishing 2 samples from each other wherein panelists select a different sample from among three samples including two being the same as each other and a different one and, after repeating this procedure several times, it is estimated whether these 2 samples differ from each other or not depending on the number of the correct answers; "Shinpan Kanno Kensa Hando Bukku", ed. by Nikkagiren Kanno Kensa Iinkai, 252–253 (1973)]. As a result, no difference was observed between the 3 samples. Namely each of them had a preferable coffee aroma.

EXAMPLES 2 TO 6 AND COMPARATIVE EXAMPLES 1 AND 2

Coffee aroma components were collected by repeating the procedure of Example 1 except replacing the aqueous solution containing 40% by weight of ethanol by an aqueous solution containing ethanol at each concentration as specified in Table 1 and the temperature in the main flask at the completion of the collection (the final temperature) was set to each temperature as specified in Table 1 too. As Table 1 shows, the procedure of Example 1 was repeated except using water being free from ethanol and an aqueous solution containing 5% by weight of ethanol and setting the final temperature to 120° C. in the Comparative Examples.

The obtained aroma components were each in the form of a yellowish liquid of pH 5.1. These aroma components were each diluted 2,000-fold with deionized water and organoleptically tested. A comparison with the results of Example 1 indicates that the coffee aroma components obtained by using aqueous solutions containing from 10 to 40% by weight of ethanol (Examples 1 to 4) show an increase in the intensity of the aroma in proportion to the content of ethanol and that the coffee aroma components obtained by using aqueous solutions containing 50% by weight and 60% by weight of ethanol (Examples 5 and 6) are comparable in intensity to the one obtained by using an aqueous solution containing 40% by weight of ethanol. Each of these products exhibited a preferable aroma.

When diluted 500-fold, on the other hand, the coffee aroma components obtained by using water free from ethanol and an aqueous solution containing 5% by weight of ethanol (Comparative Examples 1 and 2) showed aroma intensities comparable to that of the aroma component obtained by using an aqueous solution containing 40% by weight of ethanol and diluted 2,000-fold. However, these aroma components were out of balance in aroma and lost the characteristics of Arabica coffee beans produced in Brazil.

Table 1 summarizes the above-mentioned results and the results of Example 1.

TABLE 1

| Example No. | EtOH Conc. (wt %) | Final Temp. (°C.) | Aroma Intensity | Aroma Qualities |
| --- | --- | --- | --- | --- |
| Example 1 | 40 | 106 | ++++ | excellent |
| Example 2 | 10 | 117 | + | good |
| Example 3 | 20 | 114 | ++ | good |
| Example 4 | 30 | 110 | +++ | excellent |
| Example 5 | 50 | 104 | ++++ | excellent |
| Example 6 | 60 | 103 | ++++ | excellent |
| Comp. Ex. 1 | 0 | 120 | — | poor |
| Comp. Ex. 2 | 5 | 120 | — | poor |

Regarding aroma intensity, a larger number of "+" means the higher intensity. Each aroma intensity is expressed in the relative value referring the intensity of the aroma component obtained in Example 1 as "++++". The aroma intensities of Comparative Examples are not listed, since a different dilution rate was employed in these cases.

EXAMPLE 7

Pre-experiments and a main experiment were carried out by using the same apparatus and the same method as those employed in Example 1 except that 600 g portions of roasted and milled Arabica coffee beans produced in Guatemala (L-value =22; grain size distribution was the same as the one employed in Example 1) and an aqueous solution containing 60% by weight of ethanol were used.

In the pre-experiment for determining the amount of the aroma component to be collected, the flow rate of the nitrogen gas was controlled in such a manner as to give 1% of the aroma component based on the weight of the starting roasted and milled coffee beans per minute. Then the aroma component was collected for 250 minutes at intervals of 10 minutes. As a result, a preferable aroma was obtained until the cumulative amount of the collected aroma component reached 150% (after 150 minutes). However, the characteristic aroma of the Arabica coffee beans produced in Guatemala was rapidly lost after the cumulative amount exceeded 150%. Thus the final collection level was set to 150%.

In the pre-experiment for determining the collection time, when the temperature in the main flask reached 80° C., the feeding port of the feeding flask was connected with the inlet of the main flask. Then the flow rate of the nitrogen gas was adjusted in such a manner that the cumulative amount of the aroma component reached 150%, 40 minutes, 60 minutes, 90 minutes, 120 minutes. 150 minutes, 180 minutes, 210 minutes, 240 minutes and 270 minutes after the initiation of the collection of the aroma component. Thus the aroma component was collected. As a result, the temperature in the main flask at the completion of the collection was 103° C. while the treated coffee beans weighed from 620 to 630 g in each of these cases.

When the aroma of the coffee beans immediately after the treatment was evaluated, no preferable coffee aroma remained any more in the coffee beans which had been treated for 120 minutes or longer. Based on these results, the collection time to be used in the following experiment was determined as 120 minutes, namely, the shortest period of time giving the good result.

On the basis of these pre-experiments, the main experiment, wherein the amount of the aroma component based on the weight of the starting roasted and milled coffee beans was set to 150%, the collection time was set to 120 minutes and the temperature in the main flask was controlled to 80° to 103° C. , was repeated thrice. The coffee aroma components thus obtained were each in the form of a yellowish liquid of pH 4.8. The aromas of these products were organoleptically evaluated by 3 skilled panelists by the triangle test. As a result, no difference Was observed between the 3 samples. Namely, each of them had a preferable coffee aroma.

EXAMPLES 8 TO 14

Coffee aroma components were collected by repeating the procedure of Example 7 except replacing the aqueous solution containing 60% by weight of ethanol by an aqueous solution containing ethanol at each concentration as specified in Table 2 and the final temperature was set to each temperature as specified in Table 2 too.

The obtained aroma components were each in the form of a yellowish liquid of pH 4.85. These aroma components were each diluted 1,500-fold with deionized water and organoleptically tested. A comparison with the results of Example 7 indicates that the coffee aroma components obtained by using aqueous solutions containing from 10 to 60% by weight of ethanol, respectively (Examples 7 to 12) show an increase in the intensity of the aroma in proportion to the content of ethanol and that the coffee aroma components obtained by using aqueous solutions containing 70% by weight and 80% by weight of ethanol (Examples 13 and 14) are comparable in intensity to the one obtained by using an aqueous solution containing 60% by weight of ethanol. Each of these products exhibited a preferable aroma. Table 2 summarizes the above-mentioned results and the results of Example 7.

TABLE 2

| Example No. | EtOH Conc. (wt %) | Final Temp. (°C.) | Aroma Intensity | Aroma Qualities |
|---|---|---|---|---|
| Example 7 | 60 | 103 | ++++++ | excellent |
| Example 8 | 10 | 117 | + | good |
| Example 9 | 20 | 114 | ++ | good |
| Example 10 | 30 | 110 | +++ | excellent |
| Example 11 | 40 | 106 | ++++ | excellent |
| Example 12 | 50 | 104 | +++++ | excellent |
| Example 13 | 70 | 102 | ++++++ | excellent |
| Example 14 | 80 | 100 | ++++++ | excellent |

Regarding aroma intensity, a larger number of "+" means the higher intensity. Each aroma intensity is expressed in the relative value referring the intensity of the aroma component obtained in Example 7 as "++++++".

EXAMPLE 15

Pre-experiments and a main-experiment were carried out by using the same apparatus and the same method as those employed in Example 1 except that 600 g portions of roasted and milled Arabica coffee beans produced in Ethiopia (L-value =29; grain size distribution was the same as the one employed in Example 1) and an aqueous solution containing 80% by weight of ethanol were used.

In the pre-experiment for determining the amount of the aroma component to, be collected, the flow rate of the nitrogen gas was controlled in such a manner as to give 1% of the aroma component based on the weight of the starting roasted and milled coffee beans was obtained per minute. Then the aroma component was collected for 300 minutes at intervals of 10 minutes. As a result, a preferable aroma was obtained until the cumulative amount of the collected aroma component reached 180% (after 180 minutes). However, the characteristic aroma of the Arabica coffee beans produced in Ethiopia was rapidly lost after the cumulative amount exceeded 180%. Thus the final collection level was set to 180%.

In the pre-experiment for determining the collection time, when the temperature in the main flask reached 80° C., the feeding port of the feeding flask was connected with the inlet of the main flask. Then the flow rate of the nitrogen gas was adjusted in such a manner that the cumulative amount of the aroma component reached 180%, 60 minutes, 90 minutes, 120 minutes, 150 minutes, 180 minutes, 210 minutes, 240 minutes, 270 minutes and 300 minutes after the initiation of the collection of the aroma component. Thus the aroma component was collected. As a result, the temperature in the main flask at the completion of the collection was 100° C. while the treated coffee beans weighed from 610 to 615 g in each of these cases.

When the aroma of the coffee beans immediately after the treatment was evaluated, no preferable coffee aroma remained any more in the coffee beans which had been treated for 180 minutes or longer. Based on these results, the collection time to be used in the following experiment was determined as 180 minutes, namely, the shortest period of time giving the good result.

On the basis of these pre-experiments, the main experiment, wherein the amount of the aroma component based on the weight of the starting roasted and milled coffee beans was set to 180%, the collection time was set to 180 minutes and the temperature in the main flask was controlled to 80° to 100° C. , was repeated thrice. The coffee aroma components thus obtained were each in the form of a transparent, colorless liquid of pH 5.2. The aromas of these products were organoleptically evaluated by 3 skilled panelists by the triangle test. As a result, no difference was observed between the 3 samples. Namely, each of them had a preferable coffee aroma.

EXAMPLES 16 TO 19 AND COMPARATIVE EXAMPLE 3

Coffee aroma components were collected by repeating the procedure of Example 15 except replacing the aqueous solution containing 80% by weight of ethanol by an aqueous solution containing ethanol at each concentration as specified in Table 3 and the final temperature was set to each temperature as specified in Table 3 too. As Table 3 shows, the procedure of Example 1 was repeated except using an aqueous solution containing 90% by weight of ethanol and setting the final temperature to 100° C. in the Comparative Example.

The obtained aroma components were each in the form of a transparent, colorless liquid of pH 5.2. These aroma components were each diluted 1,000-fold with deionized water and organoleptically tested. A comparison with the results of Example 15 indicates that the coffee aroma components obtained by using aqueous solutions containing from 10 to 80% by weight of ethanol (Examples 15 to 19) show an increase in the intensity of the aroma in proportion to the content of ethanol have a preferable aroma and that the coffee aroma component obtained by using aqueous solutions containing 90% by weight of ethanol is comparable in intensity to the one obtained by using an aqueous solution containing 80% by weight of ethanol but somewhat loses the characteristics of the Arabica coffee beans produced in Ethiopia.

Table 3 summarizes the above-mentioned results and the results of Example 15.

TABLE 3

| Example No. | EtOH Conc. (wt %) | Final Temp. (°C.) | Aroma Intensity | Aroma Qualities |
|---|---|---|---|---|
| Example 15 | 80 | 100 | +++++ | excellent |
| Example 16 | 10 | 117 | + | good |
| Example 17 | 30 | 110 | ++ | good |
| Example 18 | 50 | 104 | +++ | excellent |
| Example 19 | 70 | 102 | ++++ | excellent |
| Comp. Ex. 3 | 90 | 100 | +++++ | poor |

Regarding aroma intensity, a larger number of "+" means the higher intensity. Each aroma intensity is expressed in the relative value referring the intensity of the aroma component obtained in Example 15 as "+++++".

According to the present invention, the preferable aroma of fresh milled coffee beans after roasted can be perfectly collected. Further, the method of the present invention does not require any complicated apparatus nor any special conditions. Namely, this method can be easily and inexpensively embodied. Further, it is an advantageous method from an industrial viewpoint.

The coffee aroma component obtained by the method of the present invention suffers from little change in aroma during the processing and over prolonged storage. When added to coffee, coffee beverages, other foods and other coffee flavoring products, therefore, this coffee aroma component can improve and enrich the qualities of the aroma of these products. Thus it is highly expected that the commercial values of these products can be elevated thereby.

While the invention has been described in detail and with reference to specific embodiments thereof, it will be apparent to one skilled in the art that various changes and modifications can be made therein without departing from the spirit and scope thereof.

What is claimed is:

1. A method for producing a coffee aroma component which comprises the steps of continuously feeding an aqueous solution containing from 10 to 80% by weight of ethanol and an inert gas into roasted and milled coffee beans heated to 80° to 120° C., the flow rate of said inert gas being 0.006 to 6 liters/hr, per kg of said roasted and milled coffee beans, the flow rate of said ethanol being 0.2 to 2 liters/hr, per kg of said roasted and milled coffee beans, contacting the roasted and milled coffee beans with said ethanol and said inert gas, wherein said ethanol and said inert gas are in the form of a saturated vapor, and then condensing at a temperature of 5° C. or below and collecting a volatile aroma component evolving from the coffee beans.

2. A method for producing a coffee aroma component as claimed in claim 1, wherein the aqueous solution containing from 10 to 80% by weight of ethanol and the inert gas are fed in the form of a mixture.

3. A method for producing a coffee aroma component as claimed in claim 1, wherein the aqueous solution containing from 10 to 80% by weight of ethanol have been preliminarily heated.

4. A method for producing a coffee aroma component as claimed in claim 2, wherein the aqueous solution containing from 10 to 80% by weight of ethanol and the inert gas have been preliminarily heated.

5. A method for producing a coffee aroma component as claimed in claim 1, wherein the volatile aroma component is formulated into a saturated vapor containing ethanol, water and an inert gas and said saturated vapor is condensed through a condenser which is opened to the atmosphere.

6. A method for producing a coffee aroma component as claimed in claim 2, wherein the volatile aroma component is formulated into a saturated vapor containing ethanol, water and an inert gas and said saturated vapor is condensed through a condenser which is opened to the atmosphere.

7. A method for producing a coffee aroma component as claimed in claim 3, wherein the volatile aroma component is formulated into a saturated vapor containing ethanol, water and an inert gas and said saturated vapor is condensed through a condenser which is opened to the atmosphere.

8. A method for producing a coffee aroma component as claimed in claim 1, wherein the inert gas is selected from the group consisting of the elements of the 18 group in the periodic table and nitrogen.

* * * * *